United States Patent
Kondo

(10) Patent No.: US 8,363,769 B2
(45) Date of Patent: Jan. 29, 2013

(54) SYNC DETECTOR AND COMMUNICATION APPARATUS SYNTHESIZING CORRELATION VALUES

(75) Inventor: Taiji Kondo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 929 days.

(21) Appl. No.: 12/466,798

(22) Filed: May 15, 2009

(65) Prior Publication Data

US 2009/0304136 A1    Dec. 10, 2009

(30) Foreign Application Priority Data

Jun. 10, 2008    (JP) ................................. 2008-152274

(51) Int. Cl.
*H04L 7/02*    (2006.01)
(52) U.S. Cl. ...................................................... 375/359
(58) Field of Classification Search .................. 375/147, 375/150, 316, 340, 342–343, 359; 370/503, 370/509
See application file for complete search history.

(56) References Cited

U.S. PATENT DOCUMENTS

| | | | | |
|---|---|---|---|---|
| 5,974,042 | A * | 10/1999 | Frank et al. ..................... | 370/342 |
| 6,075,808 | A | 6/2000 | Tsujimoto | |
| 7,203,245 | B1 * | 4/2007 | Murphy ......................... | 375/260 |
| 2007/0281649 | A1 * | 12/2007 | Maeda et al. ................. | 455/214 |
| 2007/0291632 | A1 * | 12/2007 | Li et al. ......................... | 370/203 |
| 2008/0212563 | A1 * | 9/2008 | Birru ............................. | 370/350 |

FOREIGN PATENT DOCUMENTS

| | | |
|---|---|---|
| JP | 8-265236 A | 10/1996 |
| JP | 2006-191187 A | 7/2006 |
| JP | 2007-006328 | 1/2007 |
| WO | WO2007108044 | 9/2007 |
| WO | WO 2007108044 | 9/2007 |

OTHER PUBLICATIONS

Japanese Office Action dated May 8, 2012 for Japanese Patent Application 2008-152274.
Office Action issued on May 8, 2012 for Japanese Patent Application 2008.

* cited by examiner

*Primary Examiner* — Khanh C Tran
(74) *Attorney, Agent, or Firm* — Arent Fox LLP

(57) ABSTRACT

A sync detector includes a correlation computing unit configured to receive signal values corresponding to respective sample points and to compute auto-correlation of the received signal values between sample points of interest and sample points that are situated at a distance equal to a constant number of sample points from the sample points of interest, a correlation value synthesizing unit configured to receive auto-correlation values corresponding to respective sample points obtained by the correlation computing unit and to synthesize the auto-correlation values with respect to at least two sample points among sample points that are spaced apart by the constant number of sample points thereby to compute a synthesized correlation value, and a peak-point detecting unit configured to detect a position of a sample point corresponding to a largest synthesized correlation value among synthesized correlation values corresponding to respective sample points obtained by the correlation value synthesizing unit.

13 Claims, 12 Drawing Sheets

SYNC DETECTOR AND COMMUNICATION APPARATUS SYNTHESIZING CORRELATION VALUES

CROSS-REFERENCE TO RELATED APPLICATIONS

The present application is based upon and claims the benefit of priority from the prior Japanese Patent Application No. 2008-152274 filed on Jun. 10, 2008, with the Japanese Patent Office, the entire contents of which are incorporated herein by reference.

FIELD

The disclosures herein generally relate to sync detection circuits, and particularly relate to a sync detection circuit for detecting synchronization based on the auto-correlation of signal values.

BACKGROUND

In cellular communication systems, each mobile terminal needs to stay synchronized with a base station at all times. Each mobile terminal performs an initial synchronization process for establishing synchronization with a base station at the time of power-on or hand-over. In this process, the frame timing of the communication system is detected, and synchronization is established based on the detected frame timing.

FIG. 1 is a drawing illustrating frame exchanges between a base station and a mobile terminal in a TDMA (Time Division Multiple Access) communication system. Tx_at_BS represents a signal transmitted from the base station, and Rx_at_MS represents a signal received by the mobile terminal. Further, Tx_at_MS represents a signal transmitted from the mobile terminal, and Rx_at_BS represents a signal received by the base station.

Frames occur at frame intervals Tf (e.g., 5 ms in the example illustrated in FIG. 1). Each frame is divided into a downlink-DL subframe and an uplink-UL subframe. TTG (Transmit-to-receive Transition Gap) is an interval from the transmission of a downlink subframe to the reception of an uplink subframe performed by the base station. Further, RTG (Receive-to-transmit Transition Gap) is an interval from the reception of an uplink subframe to the transmission of a downlink subframe performed by the base station. SSTTG (Subscriber Station TTG) and SSRTG (Subscriber Station RTG) are TTG and RTG, respectively, on the mobile-terminal side.

Each downlink subframe has a preamble at its beginning. The pattern of such preamble differs from base station to base station. As far as a given base station is concerned, all the subframes transmitted from this base station have the same preamble pattern. Mobile terminals are not informed of the preamble pattern. Mobile terminals thus recognize the start position of each frame by detecting the occurrences of the same pattern at a known frame interval Tf (e.g., 5 ms in the example illustrated in FIG. 1). In order to detect the positions at which the same pattern occurs at the known constant frame interval Tf (e.g., 5 ms in the example illustrated in FIG. 1), a mobile station performs synchronization detection based on auto-correlation.

FIG. 2 is a drawing showing an example of the configuration of a synchronization processing unit utilizing auto-correlation. The synchronization processing unit illustrated in FIG. 2 includes an analog-to-digital converter (ADC) 10, a correlation computing unit 11, a peak-point detecting unit 12, and a plurality of delay elements 13. The correlation computing unit 11 includes a delay element 14, a complex conjugate unit 15, a multiplication unit 16, a moving average unit 17, and an absolute value unit 18.

The analog-to-digital converter 10 converts an analog signal received by an antenna into a digital signal. The correlation computing unit 11 computes the correlation of the digital received signal output from the analog-to-digital converter 10. The correlation value $\rho$ of two complex values x and y is obtained by use of formula (1) as follows.

$$\rho(x,y)=|E(x \cdot y^*)| \quad (1)$$

Here, the function E serves to obtain an expected value. In the case of a signal that changes with time, such an expected value can be acquired by computing a temporal average. $y^*$ is the complex conjugate of y.

A received signal y is represented by use of formula (2) as follows.

$$y(k)=h(k)x(k)+n(k) \quad (2)$$

where:
k=0, 1, 2, ..., $N_{frame}$
$N_{frame}$: Number of Samples for One Frame
y(k) is a digital received signal for one frame output from the analog-to-digital converter 10. x(k) is a transmitted signal, and h(k) is a channel response function that represents the characteristics of the transmission path. Further, n(k) is noise.

The delay element 14 of the correlation computing unit 11 delays the digital received signal y(k) by $N_{frame}$ sample points (i.e., the number of sample points in one frame), thereby introducing one-frame time delay. The delayed signal output from the delay element 14 is represented by use of expression (3) as follows.

$$y(k-N_{frame})=h(k-N_{frame})x(k-N_{frame})+n(k-N_{frame}) \quad (3)$$

where:

$$h(k-N_{frame})=h(k)+\Delta h(k)$$

$\Delta h(k)$: Change in Channel Response
A temporal change in the channel response h(x) is denoted as $\Delta h(k)$.

The complex conjugate unit 15 obtains $y(k-N_{frame})^*$ that is the complex conjugate of $y(k-N_{frame})$. The multiplication unit 16 then computes the product of $y(k-N_{frame})^*$ and $y(k-N_{frame})$. A temporal average of this product is obtained by the moving average unit 17, thereby obtaining an expected value of product of $y(k-N_{frame})^*$ and $y(k-N_{frame})$. The expected value of this product is represented by use of expression (4) as follows.

$$\begin{aligned}\varepsilon(k) &= E[y(k) \cdot y(k-N_{frame})^*] \\ &= E[h(k)h(k-N_{frame})^*x(k)x(k-N_{frame})^* + \\ &\quad h(k)x(k)n(k-N_{frame}) + h(k-N_{frame})^*x(k-N_{frame})^*n(k)]\end{aligned} \quad (4)$$

The absolute value unit 18 computes the absolute value of the expected value obtained by the moving average unit 17. The expected value $\epsilon(k)$ (i.e., the absolute value of the expected value to be exact) corresponding to a sample point k output from the correlation computing unit 11 is supplied to the peak-point detecting unit 12, and is also supplied to the delay elements 13 that are serially cascaded. Each delay element 13 delays the expected value that it receives by one sample point to supply the delayed expected value to the next delay element 13 situated at the following stage, and also supplies this delayed expected value to the peak-point detecting unit 12.

The peak-point detecting unit 12 detects the maximum value among the $N_{frame}$ expected values $\epsilon(k)$ through $\epsilon(k-N_{frame}+1)$, and outputs the sample point k that corresponds to this maximum value (which is represented as k with a hat (i.e., circumflex)). Computation that obtains k corresponding to the maximum value is represented by use of expression (5) using ArgMax function as follows.

$$\hat{k} = \underset{k}{\mathrm{ArgMax}}(\varepsilon(k)) \qquad (5)$$

When the sample point detected by the peak-point detecting unit 12 correctly matches the position of the preamble symbol, equation (6) as follows is satisfied due to the fact that the preamble symbol appears at an interval equal to $N_{frame}$ samples. It should be noted that the transmitted signal x(k) is normalized such that its amplitude is equal to 1.

$$x(\hat{k})x(\hat{k}-N_{frame})^{*}=1 \qquad (6)$$

At the position of the preamble, the transmitted signal x(k) at the sample point k and the transmitted signal $x(k-N_{frame})$ situated at the $N_{frame}$-th preceding sample point from k are the same complex number. Accordingly, the result of the computation of expression (6) is equal to 1.

Substituting equation (6) into expression (4) for the expected value and expanding the expression by use of the change $\Delta h(k)$ yield expressions (7), (8), and (9) as follows.

$$\varepsilon(\hat{k}) = E\left[\begin{array}{l} h(\hat{k})h(\hat{k}-N_{frame})^{*} + h(\hat{k})x(\hat{k})n(\hat{k}-N_{frame}) + \\ h(\hat{k}-N_{frame})^{*}x(\hat{k}-N_{frame})^{*}n(\hat{k}) \end{array}\right] \qquad (7)$$

$$= E\left[\begin{array}{l} |h(\hat{k})|^{2} + h(\hat{k})\Delta h(\hat{k})^{*} + h(\hat{k})x(\hat{k})n(\hat{k}-N_{frame}) + \\ h(\hat{k}-N_{frame})^{*}x(\hat{k}-N_{frame})^{*}n(\hat{k}) \end{array}\right]$$

$$= E\left[|h(\hat{k})|^{2} + \delta h(\hat{k}) + w(\hat{k})\right]$$

$$\delta h(k) = h(k)\Delta h(k)^{*} \qquad (8)$$

$$w(k)=h(k)x(k)n(k-N_{frame})+h(k-N_{frame})^{*}x(k-N_{frame})^{*}n(k) \qquad (9)$$

Expression (8) represents an error attributable to channel fluctuation. Expression (9) represents an error attributable to the noise n(k) that is input into the correlation computing unit 11.

As described above, the expected value computed by the correlation computing unit 11 illustrated in FIG. 2 includes the channel-fluctuation-attributable error and the noise-attributable error These errors may increase to such a level that cannot be ignored relative to the gain of the correlation computation. When this happens, the synchronization processing unit illustrated in FIG. 2 cannot correctly detect the position of a preamble.

The gain of correlation computation is proportional to the number of samples taken for the correlation computation. The gain of correlation computation is equal to a ratio of the preamble symbol period to the sampling period. In the case of the WiMAX system having a bandwidth of 5 MHz, for example, a ratio of the preamble symbol period to the sampling period is equal to 576 as demonstrated below. In such a case, gain $G_{corr}$ of correlation computation is equal to 27.6 decibel as demonstrated by expression (10) shown below.

$$G_{corr} = \frac{BW \times n \times N_{FFT}(1+G)}{BW \times n}$$

$$= \frac{5.0E+6 \times (28/25) \times 512(1+(1/8))}{5.0E+6 \times (28/25)}$$

$$= 576$$

where:

BW: Nominal Channel Bandwidth  (10)

n: Sampling Factor $N_{FFT}$: FFT Size

G: CP Ratio $G_{corr}$ [dB] = $10 \times \log10(576)$
= 27.6 [dB]

The errors obtained as expressions (8) and (9) may be sufficiently large relative to the gain of correlation computation as given by expression (10). That is, the mobile terminal may be moving, and the signal-to-noise ratio may be low. In such a case, the synchronization processing unit fails to detect a correct synchronization point.

[Patent Document 1] Japanese Patent Application Publication No. 8-265236

[Patent Document 2] Japanese Patent Application Publication No. 2006-191187

SUMMARY

According to an aspect of the embodiment, a sync detector includes a correlation computing unit configured to receive signal values corresponding to respective sample points and to compute auto-correlation of the received signal values between sample points of interest and sample points that are situated at a distance equal to a constant number of sample points from the sample points of interest, a correlation value synthesizing unit configured to receive auto-correlation values corresponding to respective sample points obtained by the correlation computing unit and to synthesize the auto-correlation values with respect to at least two sample points among sample points that are spaced apart by the constant number of sample points thereby to compute a synthesized correlation value, and a peak-point detecting unit configured to detect a position of a sample point corresponding to a largest synthesized correlation value among synthesized correlation values corresponding to respective sample points obtained by the correlation value synthesizing unit.

According to another aspect, a communication apparatus includes a correlation computing unit configured to receive signal values corresponding to respective sample points as a received signal and to compute auto-correlation of the received signal values between sample points of interest and sample points that are situated at a distance equal to a constant number of sample points from the sample points of interest, a correlation value synthesizing unit configured to receive auto-correlation values corresponding to respective sample points obtained by the correlation computing unit and to synthesize the auto-correlation values with respect to at least two sample points among sample points that are spaced apart by the constant number of sample points thereby to compute a synthesized correlation value, a peak-point detecting unit configured to detect a position of a sample point corresponding to a largest synthesized correlation value among synthesized correlation values corresponding to respective sample points obtained by the correlation value synthesizing unit, and a signal processing unit configured to process the received signal by using a synchronization point that is the position of the sample point corresponding to the largest synthesized correlation value detected by the peak-point detecting unit.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments will be described in detail with reference to the accompanying drawings.

Figure 3:
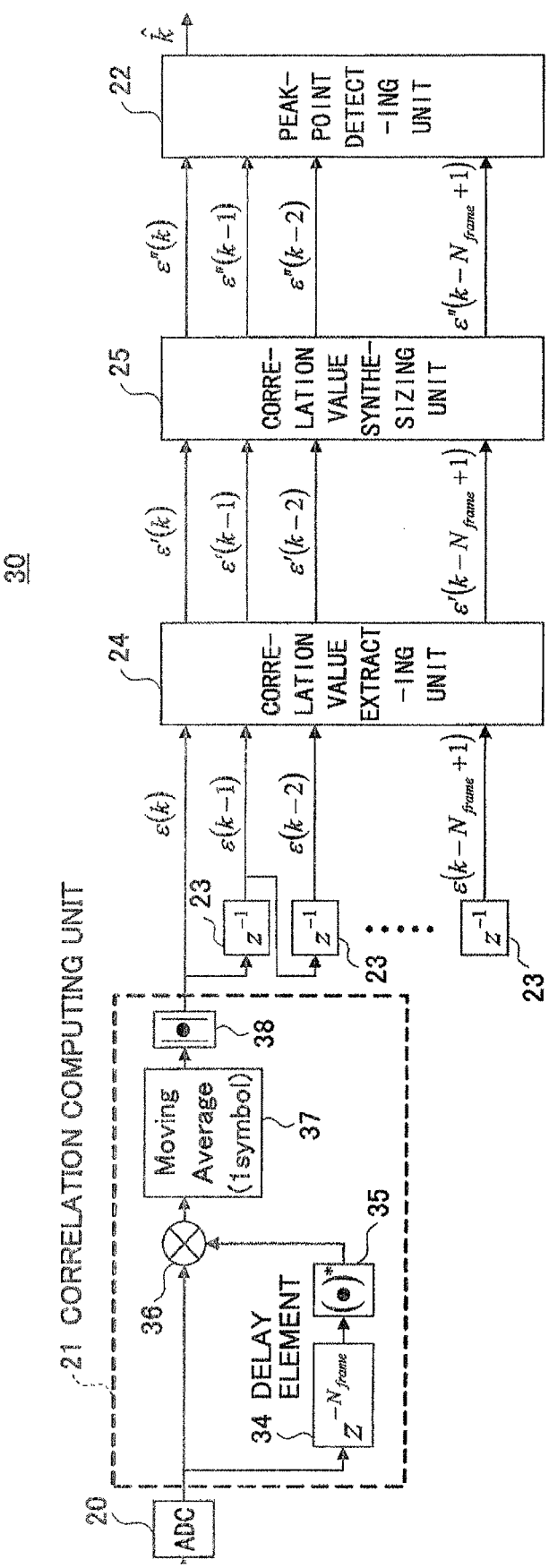
FIG. 3 is a drawing showing an example of the configuration of a sync detection circuit.

FIG. 3 is a drawing showing an example of the configuration of a sync detection circuit. A sync detecting unit 30 illustrated in FIG. 3 includes an analog-to-digital converter (ADC) 20, a correlation computing unit 21, a peak-point detecting unit 22, a plurality of delay elements 23, a correlation value extracting unit 24, and a correlation value synthesizing unit 25. The correlation computing unit 21 includes a delay element 34, a complex conjugate unit 35, a multiplication unit 36, a moving average unit 37, and an absolute value unit 38.

The analog-to-digital converter 20 converts an analog signal received by an antenna into a digital signal. The correlation computing unit 21 computes the correlation of the digital received signal output from the analog-to-digital converter 20. The correlation value ρ of two complex values x and y is obtained by use of formula (1) as previously described. A received signal y is represented by use of formula (2) as previously described.

The delay element 34 of the correlation computing unit 21 delays the digital received signal y(k) by $N_{frame}$ sample points (i.e., the number of sample points in one frame), thereby introducing one-frame time delay. The delayed signal output from the delay element 34 is represented by use of expression (3) as previously described.

The complex conjugate unit 35 obtains $y(k-N_{frame})^*$ that is the complex conjugate of $y(k-N_{frame})$. The multiplication unit 36 then computes the product of $y(k-N_{frame})^*$ and $y(k-N_{frame})$. A temporal average of this product is obtained by the moving average unit 37, thereby obtaining an expected value of the product of $y(k-N)^*$ and $y(k-N_{frame})$. The expected value of this product is represented by use of expression (4) as previously described. Further, the absolute value unit 38 computes the absolute value of the expected value obtained by the moving average unit 37.

In this manner, the correlation computing unit 21 receives received signal values corresponding to respective sample points, and computes the auto-correlation of the received signal values between sample points of interest and sample points that are situated at a constant distance of $N_{frame}$ sample points from the sample points of interest. The auto-correlation value corresponding to a sample point k output from the correlation computing unit 21 (i.e., expected value ϵ(k) or the absolute value of the expected value) is supplied to the peak-point detecting unit 24, and is also supplied to the delay elements 23 that are serially cascaded. Each delay element 23 delays the expected value that it receives by one sample point to supply the delayed expected value to the next delay element 23 situated at the following stage, and also supplies this delayed expected value to the correlation value extracting unit 24.

The correlation value extracting unit 24 selects, from auto-correlation values ϵ(k) through $ϵ(k-N_{frame}+1)$ obtained by the correlation computing unit 21 and corresponding to respective sample points, a predetermined number of auto-correlation values that are top in the list that would be made by arranging the auto-correlation values in the descending order, i.e., a predetermined number of auto-correlation values that are larger than the remaining unselected auto-correlation values. The selected auto-correlation values are supplied to the correlation value synthesizing unit 25. The number of the auto-correlation values ϵ(k) through $ϵ(k-N_{frame}+1)$ obtained by the correlation computing unit 21 is $N_{frame}$. The number of sample points in one symbol may be 576, and the number of symbols in one frame may be 50. In this case, the total number of sample points is equal to 50×576. Computation of the subsequent processing with respect to such a large number of sample points imposes heavy computation load. In consideration of this, it is desirable to reduce the number of auto-correlation values to be processed in the subsequent processing as illustrated in FIG. 3. The correlation value extracting unit 24 may select 10 auto-correlation values that are top in the list that would be made by arranging auto-correlation values in a descending order, and may supply these 10 selected auto-correlation values to the correlation value synthesizing unit 25. ϵ'(k) through $ϵ'(k-N_{frame}+1)$ obtained by selecting x auto-correlation values are represented by use of expression (11) as follows.

$$ϵ'(k \bmod N_{frame}) = \text{Top}x(ϵ(k \bmod N_{frame})) \quad (11)$$

where:

$$Topx(\varepsilon(k)) = \begin{cases} \varepsilon(k) & \text{if } \varepsilon(k) \text{ is within top } x \text{ in frame of interest} \\ 0 & \text{other} \end{cases} \quad (11)$$

In FIG. 3, the number of the auto-correlation values $\varepsilon'(k)$ through $\varepsilon'(k-N_{frame}+1)$ output from the correlation value extracting unit 24 after the selection as described above is $N_{frame}$. It should be noted that some of these auto-correlation values are zero if they are not selected according to mathematical expression (11). In actual apparatus, only the selected auto-correlation values (i.e., 10 auto-correlation values in the above-noted example) may be supplied from the correlation value extracting unit 24 to the correlation value synthesizing unit 25 as will be described later.

The correlation value synthesizing unit 25 receives the auto-correlation values corresponding to the respective sample points obtained by the correlation computing unit 21. In the configuration illustrated in FIG. 3, among the auto-correlation values obtained by the correlation computing unit 21, only a predetermined number of auto-correlation values are selected and extracted by the correlation value extracting unit 24, followed by supplying these predetermined number of auto-correlation values to the correlation value synthesizing unit 25. The correlation value synthesizing unit 25 synthesizes auto-correlation values with respect to at least two sample points among the sample points that are spaced apart by constant $N_{frame}$ sample points, thereby to compute a synthesized correlation value. For example, among sample points k, $k+N_{frame}$, $k+2N_{frame}$, $k+3N_{frame}$, and so on, two consecutive sample points k and $k+N_{frame}$ are selected as sample points for synthesis, and $\varepsilon'(k)$ and $\varepsilon'(k+N_{frame})$ corresponding to these sample points are synthesized to generate a synthesized correlation value. At least two sample points to be synthesized as described above may be two consecutive ones of the sample points that are spaced apart by a constant number of sample points. Alternatively, two sample points k and $k+2N_{frame}$ that have one intervening sample point are selected as sample points for synthesis, and $\varepsilon'(k)$ and $\varepsilon'(k+2N_{frame})$ corresponding to these sample points are synthesized to generate a synthesized correlation value. In this manner, at least two sample points to be synthesized may be every n-th one of the sample points that are spaced apart by a constant number of sample points.

The correlation value synthesizing unit 25 may perform the synthesizing of auto-correlation values by adding up the auto-correlation values. Namely, the synthesizing of $\varepsilon'(k)$ and $\varepsilon'(k+N_{frame})$, for example, is the obtaining of a sum of $\varepsilon'(k)$ and $\varepsilon'(k+N_{frame})$. Alternatively, synthesizing may be performed by adding up the squires of auto-correlation values, or may be performed by adding up values made by multiplying auto-correlation values by weighting factors. Synthesizing computation suffices as long as the synthesizing of auto-correlation values results in the signal components being added up to increase, and the error components such as noise components being added up to decrease in relative terms as the error components are uncorrelated to each other between the auto-correlation values.

The addition of a auto-correlation values by the correlation value synthesizing unit 25 is represented by use of expression (12) as follows.

$$\varepsilon''(k \bmod N_{frame}) = \sum_{m=0}^{\alpha} Topx(\varepsilon(k \bmod N_{frame} + m \times N_{frame})) \quad (12)$$

In FIG. 3, the number of the synthesized correlation values $\varepsilon''(k)$ through $\varepsilon''(k-N_{frame}+1)$ output from the correlation value synthesizing unit 25 is $N_{frame}$. It should be noted that some of these synthesized correlation values are zero if they are not selected according to mathematical expressions (11) and (12). Actual apparatus may output Nframe synthesized correlation values, or may output a smaller number of synthesized correlation values.

The peak-point detecting unit 22 detects the position of a sample point corresponding to the largest synthesized correlation value among the synthesized correlation values corresponding to the respective sample points obtained by the correlation value synthesizing unit 25. For example, the peak-point detecting unit 25 detects the maximum value among the $N_{frame}$ synthesized correlation values $\varepsilon''(k)$ through $\varepsilon''(k-N_{frame}+1)$, and outputs the sample point k that corresponds to this maximum value (which is represented as k with a hat (i.e., circumflex)). Computation that obtains k corresponding to the maximum value is represented by use of expression (13) using ArgMax function as follows.

$$\hat{k} = \underset{k \bmod N_{frame}}{\text{ArgMax}} \left( \sum_{m=0}^{\alpha} Topx(\varepsilon(k + m \times N_{frame})) \right) \quad (13)$$

When the sample point detected by the peak-point detecting unit 22 correctly matches the position of the preamble symbol, the preamble symbol appears at an interval equal to $N_{frame}$ samples. In the following, the selection process performed by the correlation value extracting unit 24 is ignored for the sake of simplicity of explanation, and the correlation value synthesizing unit 25 performs its synthesizing process with respect to all the sample points. In this case, the expected value of expression (7) as previously described is modified by the synthesis process to expression (14) as follows.

$$\varepsilon(\hat{k}) = \sum_{m=0}^{\alpha} E\left[ |h(\hat{k} + m \times N_{frame})|^2 + \delta h(\hat{k} + m \times N_{frame}) + w(\hat{k} + m \times N_{frame}) \right] \quad (14)$$

$$= \sum_{m=0}^{\alpha} E\left[ |h(\hat{k} + m \times N_{frame})|^2 \right]$$

The reason why the second term δh and the third term w disappear is that the channel-fluctuation-attributable error and noise-attributable error can be regarded as having no correlation between signals to be synthesized. Namely, the α-time synthesizing processes reduce these errors to ignorable size.

As described above, the sync detecting unit 30 illustrated in FIG. 3 uses the correlation value synthesizing unit 25 to synthesize plural auto-correlation values, thereby improving the reliability of auto-correlation values. As a result, the synchronization sample points detected by the sync detecting unit 30 accurately match the positions of the preambles.

Figure 4:
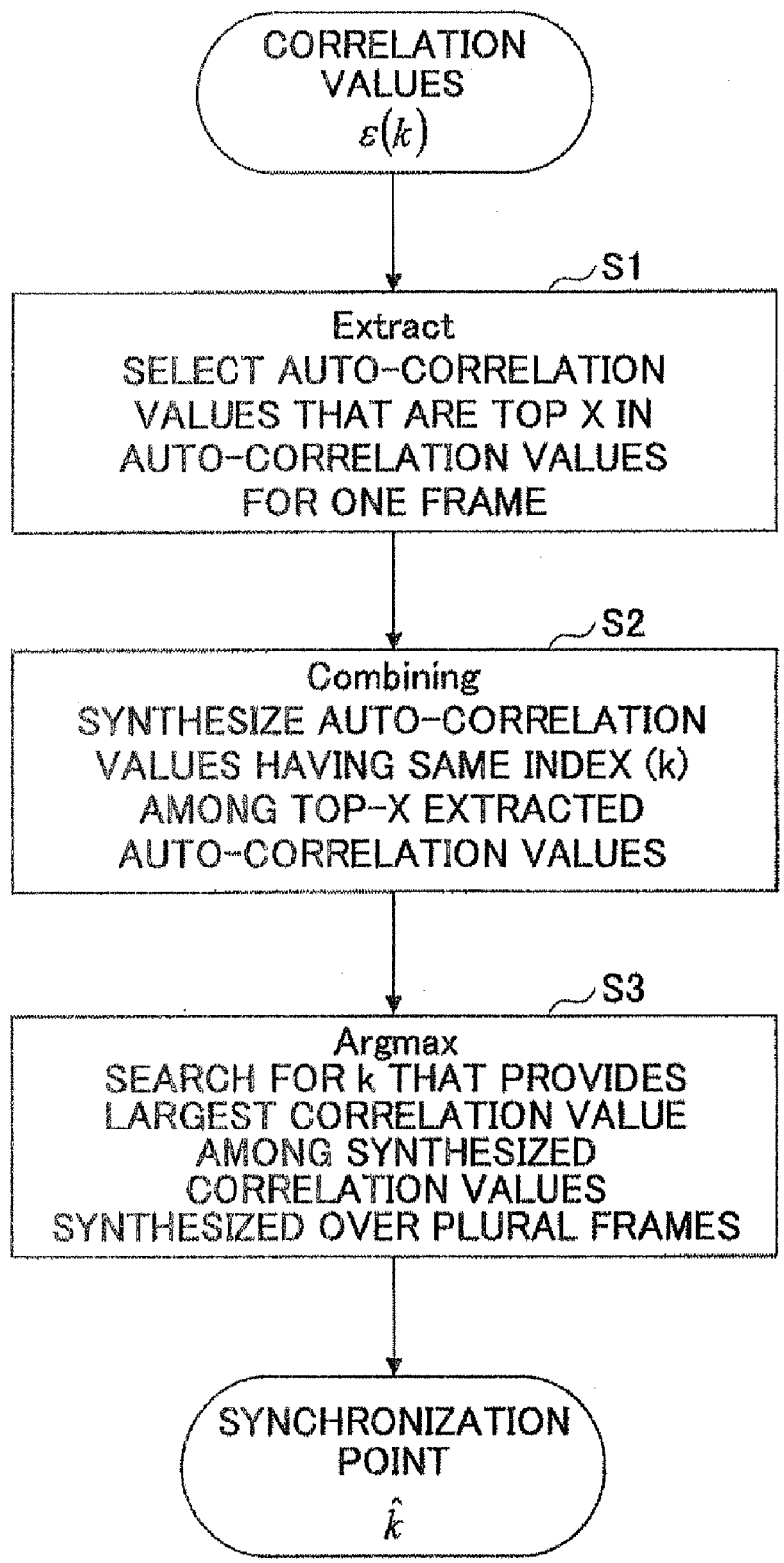
FIG. 4 is a flowchart illustrating a process of detecting synchronization points performed by the sync detecting unit.

FIG. 4 is a flowchart illustrating a process of detecting synchronization points performed by the sync detecting unit 30. In step S1 of FIG. 4, x top values of the auto-correlation values for one frame are extracted. Namely, x auto-correlation values that are the top x in the list that would be made by arranging $\epsilon(k)$ through $\epsilon(k-N_{frame}+1)$ in the descending order are selected. With respect to each of the x selected auto-correlation values, the value of the corresponding sample point k is stored in memory as an index together with data indicative of the auto-correlation value.

In step S2, auto-correlation values having the same index (k) are synthesized among the extracted auto-correlation values that are the top x. As an example, x may be 3, and the sample points k for the top three auto-correlation values selected from the first one frame may be 243, 5849, and 16983. Further, the sample points k for the top three auto-correlation values selected from the next one frame may be 243, 5852, and 16983. In this case, $\epsilon'(k)$ corresponding to the sample point k equal to 243 is subjected to synthesizing between the two frames. By the same token, $\epsilon'(k)$ corresponding to the sample point k equal to 16983 is subjected to synthesizing between the two frames. As for $\epsilon'(k)$ corresponding to the sample point k equal to 5849 and $\epsilon'(k)$ corresponding to the sample point k equal to 5852 do not have data at the corresponding sample position in the opposite frame. No synthesizing process is thus performed. Alternatively, synthesizing with zero may be performed by assuming that the data at the corresponding position is zero.

In step S3, k providing the largest correlation value among the synthesized correlation values obtained from the plural frames is searched for. This is done by first identifying the largest synthesized correlation value among the synthesized correlation values obtained by applying synthesizing processes to two or more frames. Then, the value of k providing this largest synthesized correlation value is output as a synchronization sample point.

Figure 5:
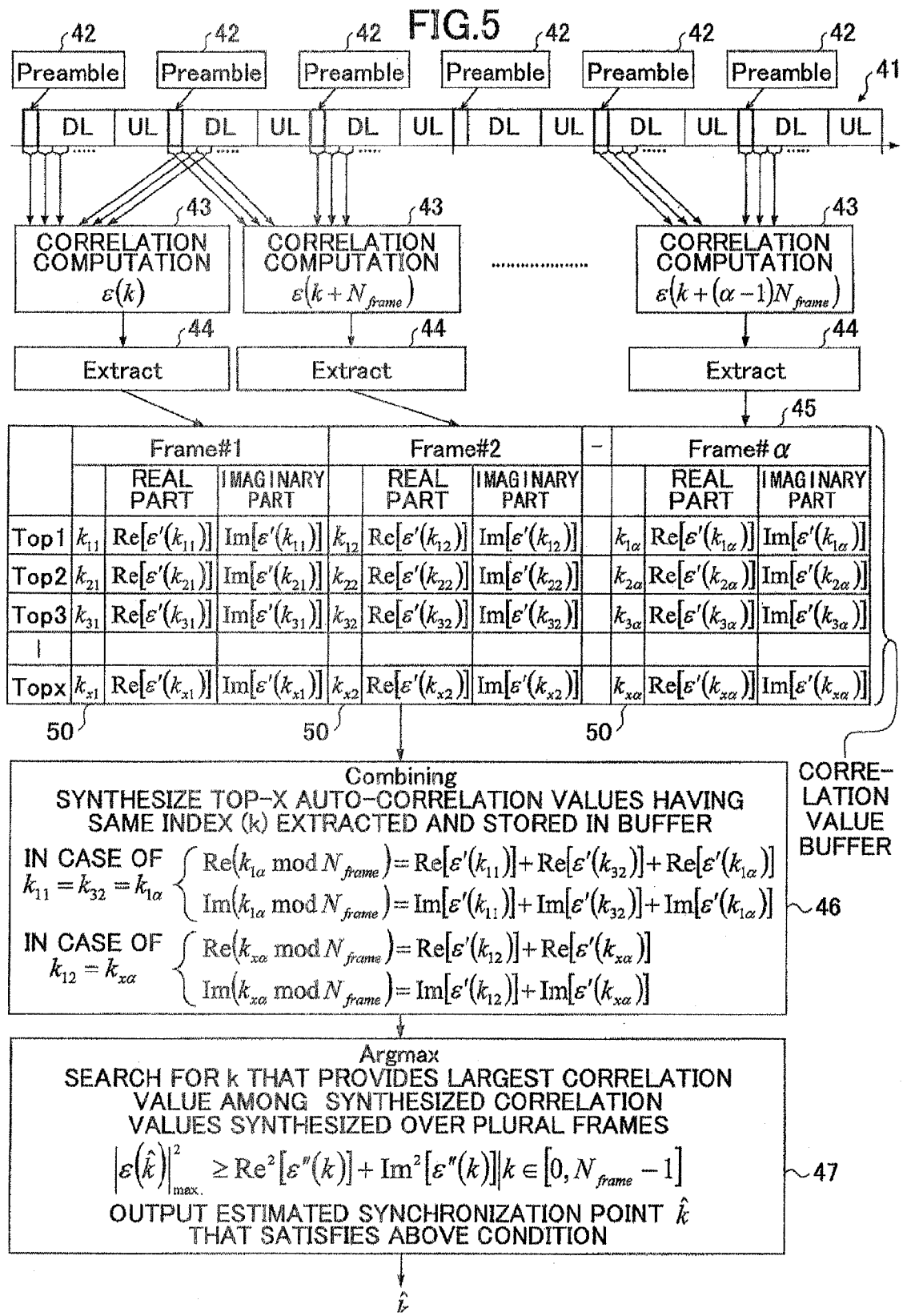
FIG. 5 is a drawing illustrating the detail of a synchronization detection process performed by the sync detecting unit.

FIG. 5 is a drawing illustrating the detail of a synchronization detection process performed by the sync detecting unit 30. A plurality of frames 41 are exchanged between a base station and a mobile terminal Each frame includes a downlink subframe DL and an uplink subframe UL. Each downlink subframe DL has a preamble 42 at its beginning for the purpose of indicating the frame position. The sync detecting unit 30 illustrated in FIG. 3 serves to detect the position of the preamble 42.

The correlation computing unit 21 of the sync detecting unit 30 computes the auto-correlations of the received signal. This auto-correlation computation is illustrated as auto-correlation computation 43 in FIG. 5. Specifically, the correlation computing unit 21 obtains an auto-correlation value for each sample point k between the first frame and the second frame. This auto-correlation value is illustrated as $\epsilon(k)$ in FIG. 5. After this, the correlation computing unit 21 obtains an auto-correlation value for each sample point k between the second frame and the third frame. This auto-correlation value is illustrated as $\epsilon(k+N_{frame})$ in FIG. 5. The correlation computing unit 21 keeps obtaining an auto-correlation value, and, at the end, obtains an auto-correlation value for each sample point k between the α-th frame and the α+1-th frame. This auto-correlation value is illustrated as $\epsilon(k+(\alpha-1)N_{frame})$ in FIG. 5.

For the sake of simplicity of explanation, FIG. 5 provides an illustration as if the correlation computation starts from the beginning of a downlink subframe. In reality, however, boundaries between the frames 41 are not known to the mobile terminal. The correlation computation of the received signal may thus be started from any sample point that is selected as desired. In the following description, the term "frame" refers to a portion corresponding to the number of sample points for one frame that starts from such a selected sample point, and also refers to a portion corresponding to the number of sample points for one frame with respect to each of the subsequent frame periods.

After the correlation computing unit 21 computes the $N_{frame}$ auto-correlation values for one frame, the correlation value extracting unit 24 selects the top x values from these $N_{frame}$ auto-correlation values for one frame. This extraction process is illustrated as Extract 44 in FIG. 5. The extraction process 44 is performed successively with respect to each frame by the correlation value extracting unit 24.

Figure 6:
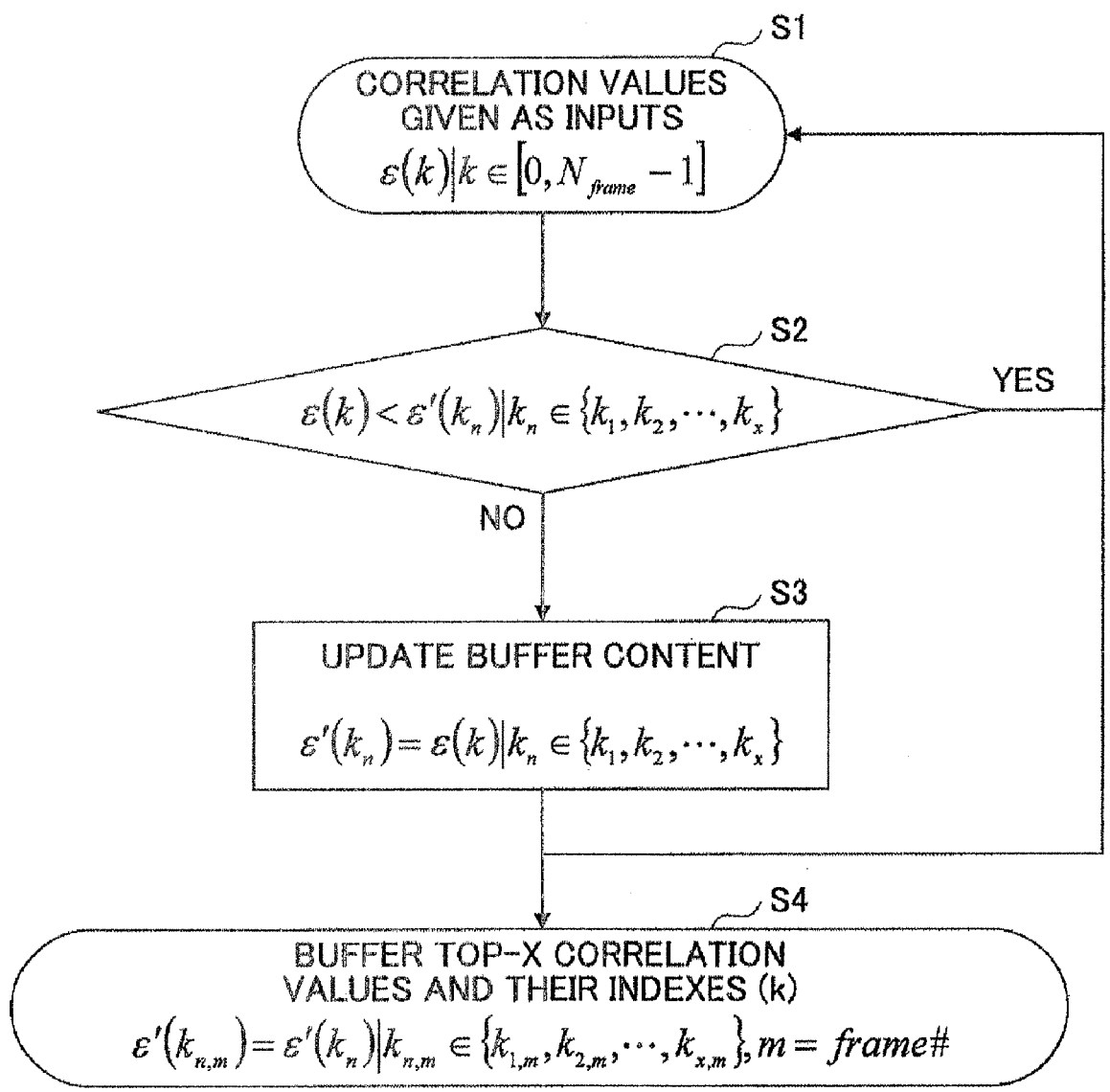
FIG. 6 is a flowchart illustrating an extraction process performed with respect to auto-correlation values for one frame.

FIG. 6 is a flowchart illustrating an extraction process performed with respect to $N_{frame}$ auto-correlation values for one frame. In step S1 of FIG. 6, the correlation value extracting unit 24 selects an auto-correlation value $\epsilon(k)$ at a sample point k of interest in the range from 0 to $N_{frame}-1$. In step S2, the correlation value extracting unit 24 checks whether the auto-correlation value $\epsilon(k)$ at the sample point k of interest is smaller than the auto-correlation values $\epsilon'(k)$ that have already been selected as the top x. If the check result is yes, the procedure returns to step S1, in which the correlation value extracting unit 24 selects an auto-correlation value at a next sample point of interest. The top-x auto-correlation values that have already been selected and the values of the corresponding sample points k are stored in a buffer (i.e., stored in memory).

If the check result in step S2 is no, the correlation value extracting unit 24 updates, in step S3, the top-x auto-correlation values $\epsilon'(k)$ and the values of the corresponding sample points k with the auto-correlation value $\epsilon(k)$ at the sample point k of interest and the value of the sample point k of interest. Namely, the smallest one of the top-x auto-correlation values and the value of the corresponding sample point k are replaced with the auto-correlation value at the sample point of interest and the value of the sample point of interest, respectively. It there is a sample point k that has yet to be processed, the procedure returns to step S1 and continues from thereon.

The above-described procedure is performed with respect to the auto-correlation values $\epsilon(k)$ at all the sample points k in the range from 0 to $N_{frame}-1$, thereby obtaining the top-x auto-correlation values among these auto-correlation values and the values of the corresponding sample points k. In step S3, these top-x auto-correlation values and the values of the corresponding sample points k are stored in a buffer (i.e., stored in memory).

In FIG. 5, buffer data that stores the top-x auto-correlation values and the values of the corresponding sample points k are illustrated as correlation value buffer data 45. The top-x auto-correlation values obtained for the data of the first frame are stored in a Frame#1 field. In this example, each auto-correlation value is comprised of a real part Re[•] and an imaginary part Im[•]. The values of sample points $k_{11}$ through $k_{x1}$ corresponding to these top-x auto-correlation values are stored in a sample value field 50.

By the same token, the top-x auto-correlation values obtained for the data of the second frame are stored in a Frame#2 field. Also, the values of sample points $k_{12}$ through $k_{x2}$ corresponding to these top-x auto-correlation values are stored in the sample value field 50. In the same manner, the top-x auto-correlation values obtained for the data of the α-th frame are stored in a Frame#α field. Further, the values of sample points $k_{1\alpha}$ through $k_{x\alpha}$ corresponding to these top-x auto-correlation values are stored in the sample value field 50.

As described above, each auto-correlation value in this example is comprised of a real part Re[•] and an imaginary part Im[•]. In this manner, each auto-correlation value comprised of the real part Re[•] and the imaginary part Im[•] may be passed from a given-stage processing unit to a next-stage processing unit in the form of a complex value. In this arrangement, an absolute value may be obtained as such a need arises in data processing such as comparison computation.

Based on the correlation value buffer data 45 obtained as described above, the correlation value synthesizing unit 25 synthesizes auto-correlation values. This synthesizing process is illustrated as Combining 46 in FIG. 5. In the Combining 46, auto-correlation values having the same index (k) are synthesized among the top-x auto-correlation values stored in the correlation value buffer data 45. In the example illustrated in FIG. 5, $k_{11}$ may be equal to $k_{32}$ and $k_{1\alpha}$. In this case, the three auto-correlation values corresponding to these sample points are added up to produce a synthesized correlation value. Further, $k_{12}$ may be equal to $k_{x\alpha}$. In this case, the two auto-correlation values corresponding to these sample points are added up to produce a synthesized correlation value. The synthesized values may be obtained with respect to all the sample points k in the range from 0 to $N_{frame}-1$.

Figure 7:
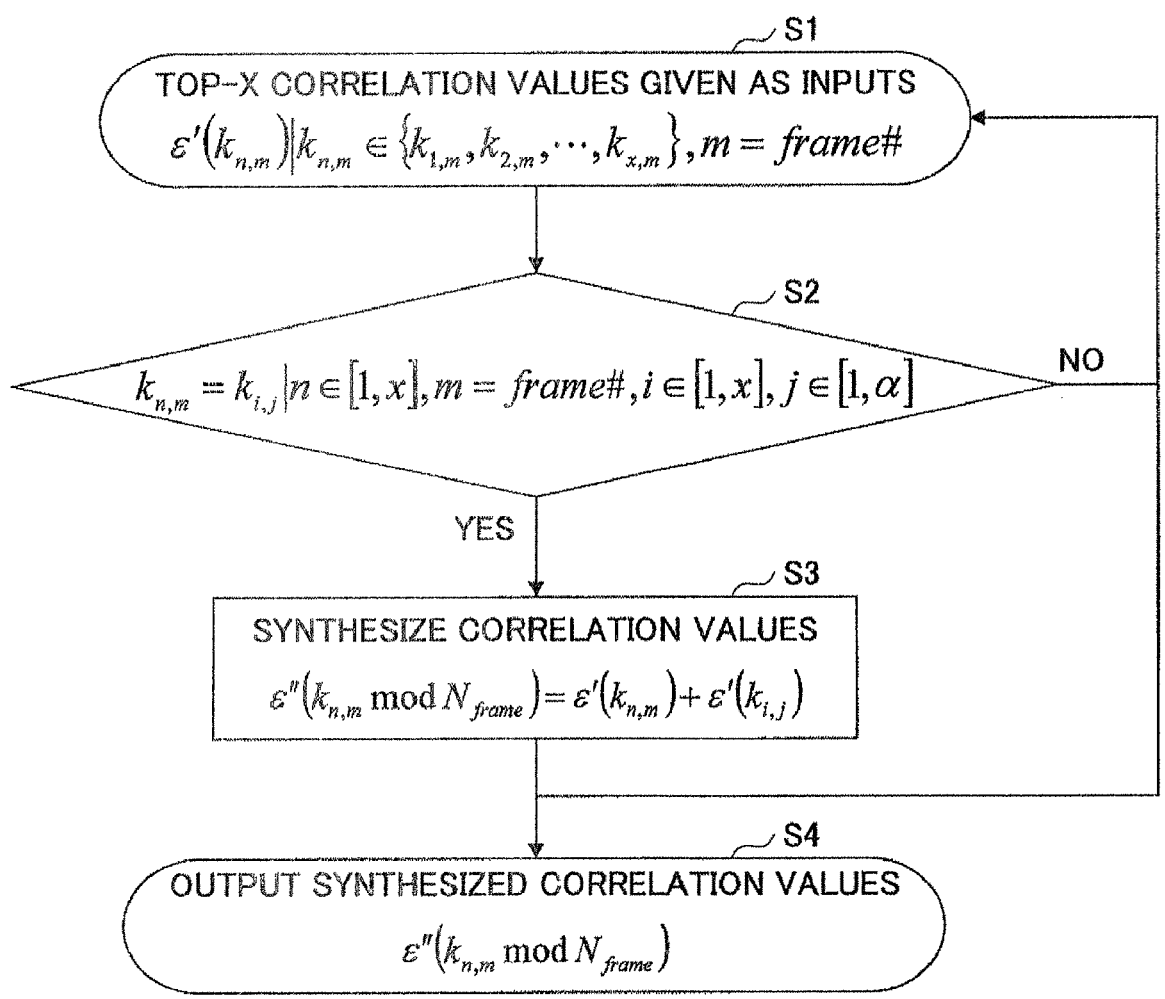
FIG. 7 is a flowchart illustrating a synthesizing process.

FIG. 7 is a flowchart illustrating a synthesizing process. In step S1 of FIG. 7, the correlation value synthesizing unit 25 selects a sample point $k_{n,m}$ of interest among the x sample points k corresponding to the m-th frame. In step S2, the correlation value synthesizing unit 25 checks whether the value of the sample point $k_{n,m}$ of interest is equal to any one of the values of the x sample points of each frame. If no sample point having the identical value is found (i.e., the check result is no), the procedure returns to step S1, in which the correlation value synthesizing unit 25 selects a next sample point of interest.

If a sample point having the identical value is found (i.e., the check result in step S2 is yes), the correlation value synthesizing unit 25 synthesizes auto-correlation values in step S3. Namely, the correlation value synthesizing unit 25 adds up the auto-correlation value $\epsilon'(k_{n,m})$ at the sample point $k_{n,m}$ of interest and the auto-correlation value $\epsilon'(k_{i,j})$ at the sample point $k_{i,j}$ equal to the sample point $k_{n,m}$ of interest. This produces a synthesized correlation value $\epsilon''$. This process in step S3 is performed with respect to all the sample points $k_{i,j}$ that are found in step S2 as being equal to the sample point $k_{n,m}$ of interest. With this, the procedure of synthesizing auto-correlation values with respect to the sample point $k_{n,m}$ of interest comes to an end.

If there is a sample point k that has yet to be processed, the procedure returns to step S1 and continues from thereon. The processes from step S1 to step S3 are performed with respect to all the frames while excluding the sample points for which the synthesizing of correlation values has already been finished. With this arrangement, the synthesized correlation values are obtained with respect to all the sample points in the range from 0 to $N_{frame}-1$. In step S4, the synthesized correlation values $\epsilon''$ that are obtained as final results are output.

There may be a sample point that is not selected as the top x in any one of the m frames among the sample points in the range from 0 to $N_{frame}-1$. Such a sample point may be treated as having a synthesized correlation value that is equal to zero. It should be noted that the sample points in the range from 0 to $N_{frame}-1$ refer to the $0^{th}$ to $N_{frame}-1^{th}$ sample points starting from the beginning of each frame.

Referring to FIG. 5 again, Argmax 47 that is a process performed by the peak-point detecting unit 22 to detect the position of the largest value among the synthesized correlation values is performed following the synthesizing process 46. This Argmax 47 identifies the largest synthesized correlation value among the synthesized correlation values obtained by the synthesizing process 46, followed by identifying the value of the sample point k corresponding to the largest synthesized correlation value. The obtained value of k is output as an estimated synchronization point.

Figure 8:
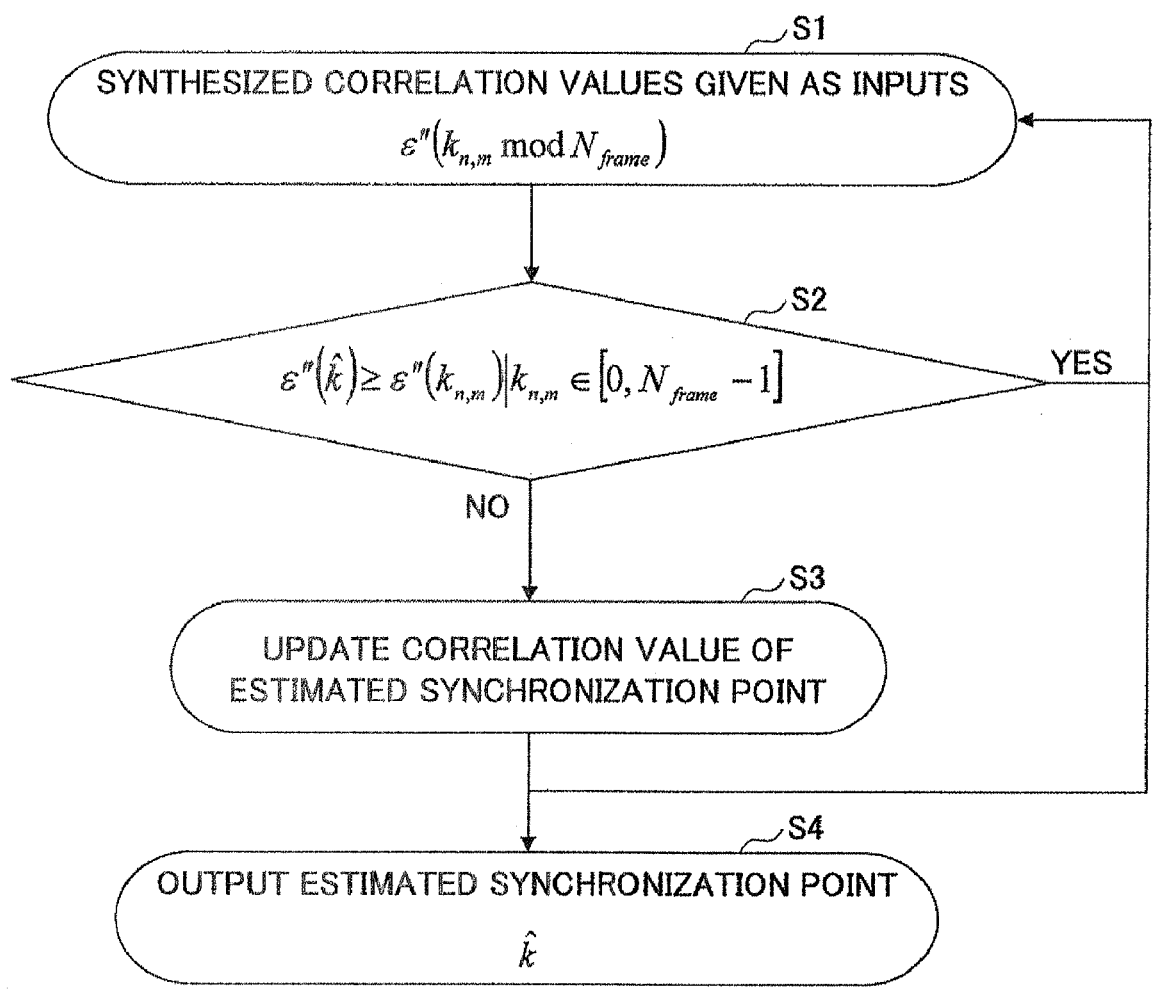
FIG. 8 is a flowchart illustrating a process of detecting the position of the largest synthesized correlation value.

FIG. 8 is a flowchart illustrating a process of detecting the position of the largest synthesized correlation value. In step S1 of FIG. 8, the peak-point detecting unit 22 selects a synthesized correlation value $\epsilon''$ at a sample point of interest in the range from 0 to $N_{frame}-1$. In step S2, the peak-point detecting unit 22 checks whether the synthesized correlation value $\epsilon''$ at the sample point of interest is smaller than the synthesized correlation value $\epsilon''$ that has already been selected as the estimated synchronization point. If the check result is yes, the procedure returns to step S1, in which the peak-point detecting unit 22 selects a synthesized correlation value $\epsilon''$ at a next sample point of interest. If the check result in step S2 is no, the peak-point detecting unit 22 replaces in step S3 the synthesized correlation value $\epsilon''$ of the estimated synchronization point with the synthesized correlation value $\epsilon''$ at the sample point of interest. If there is a sample point k that has yet to be processed, the procedure returns to step S1 and continues from thereon.

The above-described procedure is performed with respect to the synthesized correlation values $\epsilon''$ at all the sample points k in the range from 0 to $N_{frame}-1$, thereby obtaining the largest value among these synthesized correlation values $\epsilon''$. In step S4, the value of the sample point k corresponding to the largest synthesized correlation value $\epsilon''$ as obtained above is output as an estimated synchronization point.

Figure 1:
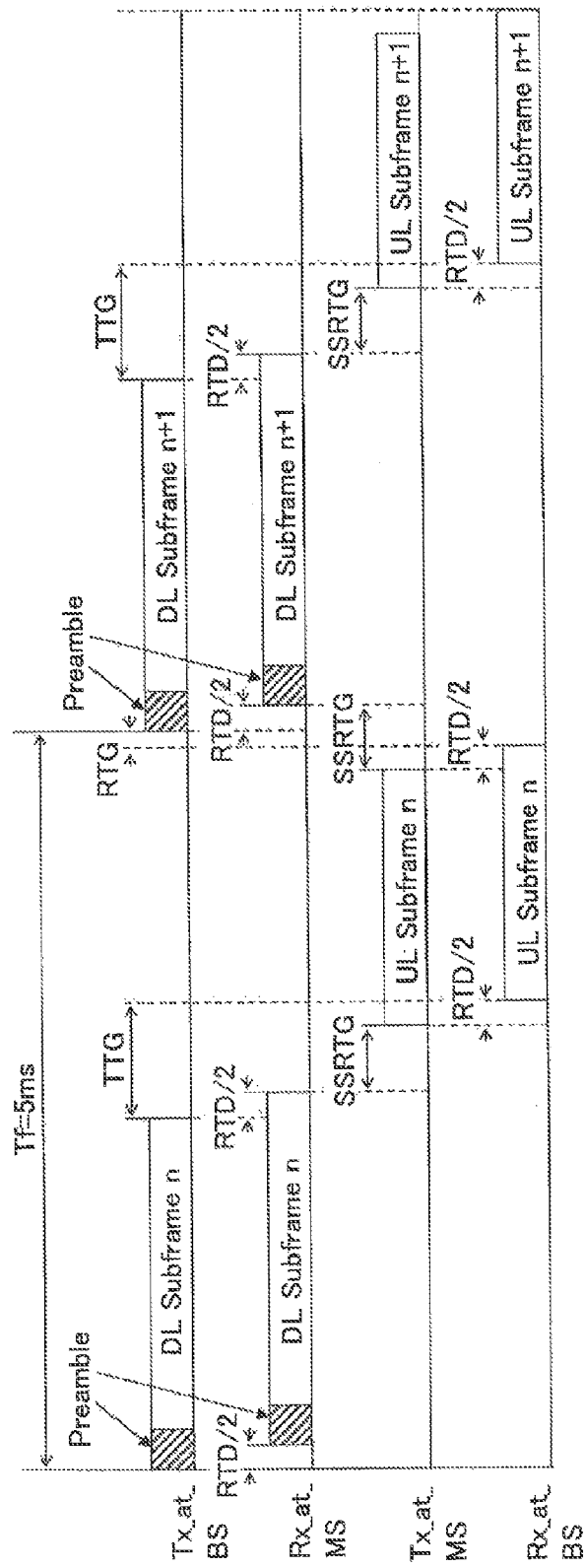
FIG. 1 is a drawing illustrating frame exchanges between a base station and a mobile terminal in a TDMA communication system.
Figure 2:
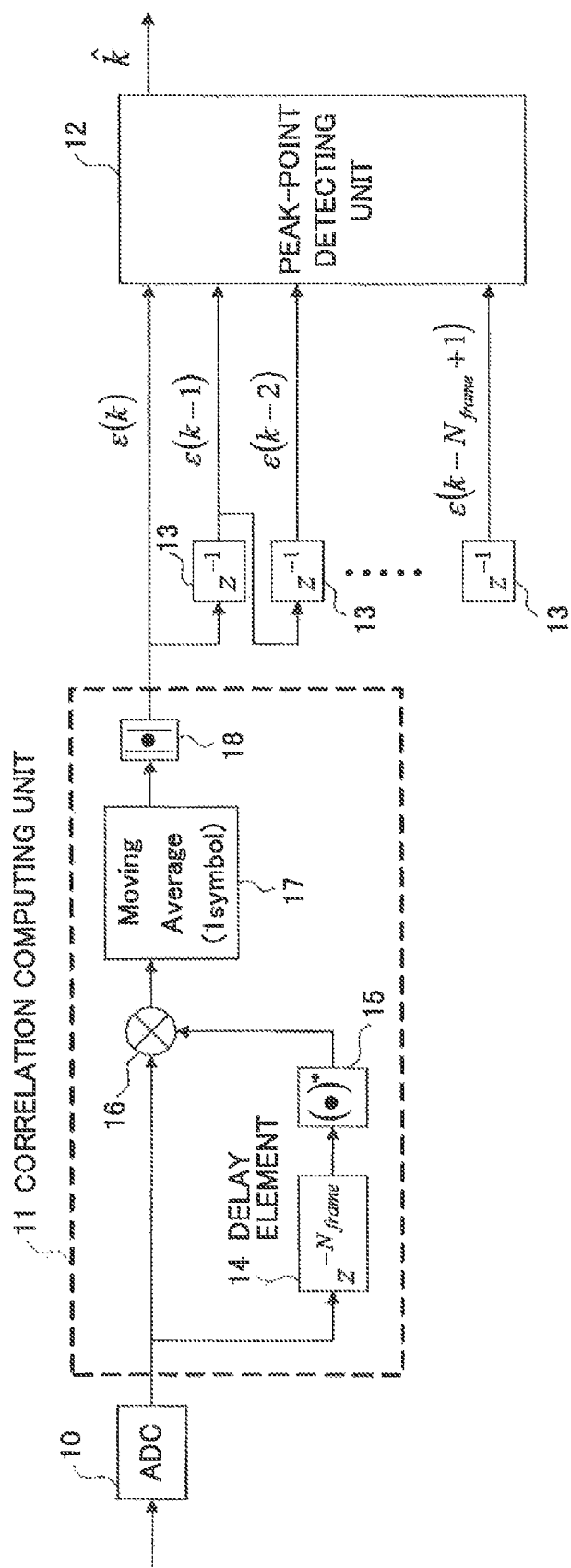
FIG. 2 is a drawing showing an example of the configuration of a synchronization processing unit utilizing auto-correlation.
Figure 9:
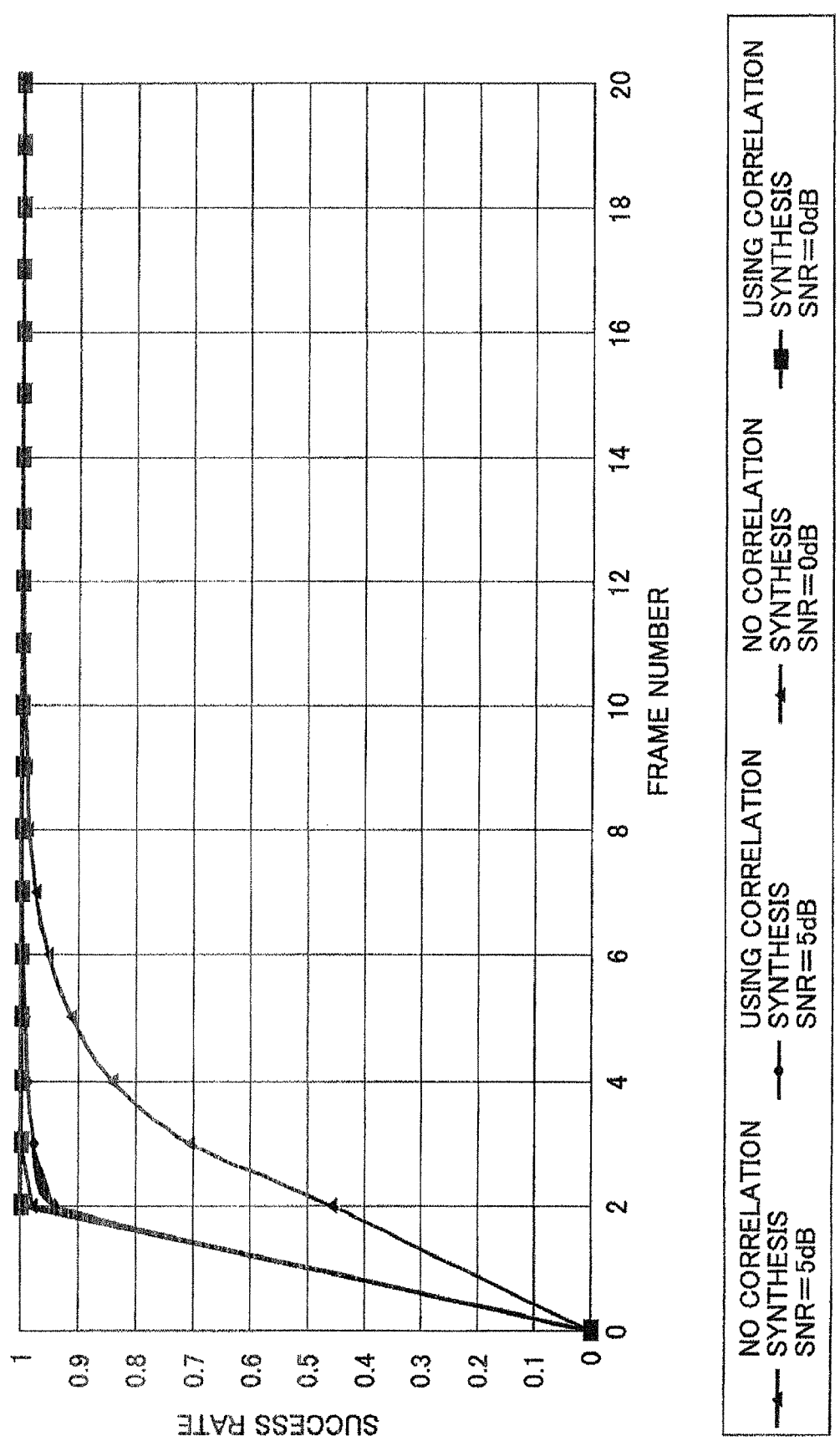
FIG. 9 is a drawing illustrating the results of computer simulation indicative of the number of frames that are necessary to successfully establish synchronization.

FIG. 9 is a drawing illustrating the results of computer simulation indicative of the number of frames that are necessary to successfully establish synchronization. FIG. 9 illustrates the possibility of successfully establishing synchronization by using a given number of frames. Such possibility is illustrated for both the case of a signal-to-nose ratio of 0 dB and the case of a signal-to-nose ratio of 5 dB with respect to the case of no correlation synthesis (i.e., corresponding to the related-art configuration illustrated in FIG. 2) and the case of using correlation synthesis (i.e., corresponding to the configuration illustrated in FIG. 3). In the case of no correlation synthesis, an attempt to establish synchronization for a given frame is made. If this attempt fails, an attempt to establish synchronization for a next following frame is made. In the case of a signal-to-noise ratio of 5 dB with no correlation synthesis, for example, the possibility of successfully establishing synchronization in the second frame is approximately 0.45. The possibility of successfully establishing synchronization is merely 0.95 even for the sixth frame. In the case of using correlation synthesis by utilizing the configuration illustrated in FIG. 3, the possibility of successfully establishing synchronization is approximately 0.95 by use of correlation synthesis between two frames in the case of a signal-to-noise ratio of 5 dB. If correlation synthesis uses three frames, the possibility of successfully establishing synchronization reaches almost 100%.

Figure 10:
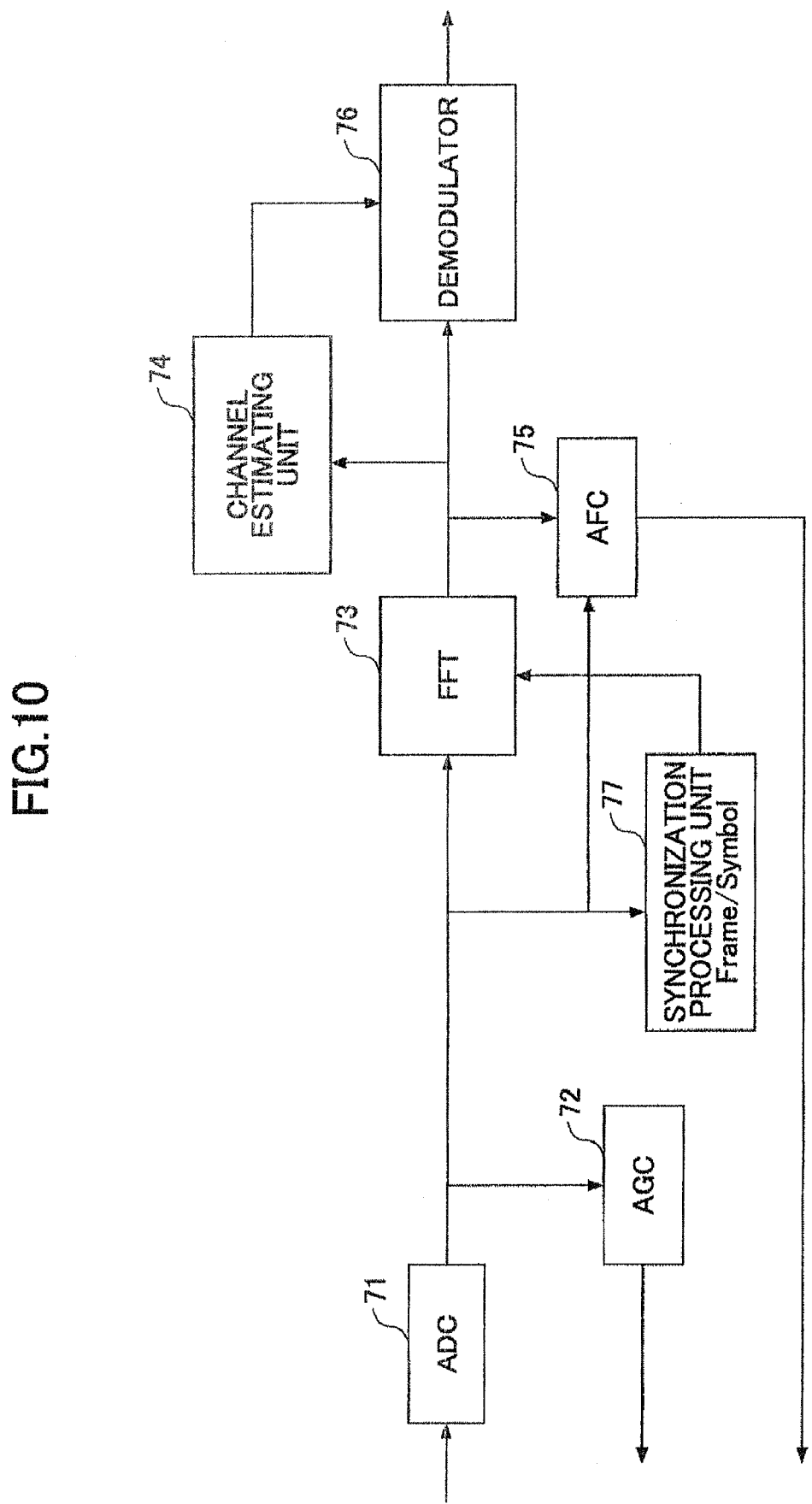
FIG. 10 is a drawing illustrating an example of the configuration of an OFDM receiver.

FIG. 10 is a drawing illustrating an example of the configuration of an OFDM receiver. The sync detector illustrated in FIG. 3 may be used in a receiver based on the OFDM (Orthogonal Frequency Division Multiplexing) method for the purpose of detecting frame synchronizing timing. A receiver illustrated in FIG. 10 includes an analog-to-digital converter (ADC) 71, an auto-gain-control unit (AGC) 72, an FFT unit 73, a channel estimating unit 74, a auto-frequency-control unit (AFC) 75, a demodulator 76, and a synchronization processing unit 77. An OFDM signal received by an antenna is demodulated by a receiving circuit into a baseband signal, which is then converted by the analog-to-digital converter 71 into a digital received signal. The auto-gain-control unit 72 controls the gain of the digital received signal output from the analog-to-digital converter 71.

The synchronization processing unit 77 corresponds to the sync detecting unit illustrated in FIG. 3. The synchronization processing unit 77 can detect a synchronization point with high accuracy by use of correlation synthesis over a plurality of frames. An estimated synchronization point detected by the synchronization processing unit 77 is supplied to the FFT unit 73. The FFT unit 73 uses the estimated synchronization point detected by the synchronization processing unit 77 as the start point of a frame to perform FFT (Fast Fourier Transform) to demodulate the received signal. The auto-frequency-control unit 75 performs an auto-frequency-control process based on the demodulation results obtained by the FFT unit 73. The channel estimating unit 74 performs channel estimation based on the demodulated signal obtained by the FFT unit 73 to detect a phase displacement in the received signal. The demodulator 76 uses the estimated channel results to perform synchronous detection with respect to the received signal. Channel estimation makes it possible to obtain a high-quality received signal that is free from the effect of multi-path noise.

As described above, the synchronization processing unit 77 uses the configuration illustrated in FIG. 3 to perform correlation synthesis over a plurality of frames, thereby detecting a synchronization point with high accuracy. Namely, the synchronization processing unit 77 uses the correlation value synthesizing unit 25 illustrated in FIG. 3 to synthesize plural auto-correlation values, thereby improving the reliability of auto-correlation values. As a result, the detected synchronization sample points accurately match the positions of the preambles.

The correlation synthesis as represented by expression (12) may be performed with respect to non-continuous frames as represented by expression (15) as follows.

$$\varepsilon''(k \bmod N_{frame}) = \sum_{m=0}^{\alpha} Topx(\varepsilon(k \bmod N_{frame} + \gamma m \times N_{frame})) \quad (15)$$

where:

$\gamma$: $f(f_d)$ $f_d$: Doppler Frequency

Figure 11:
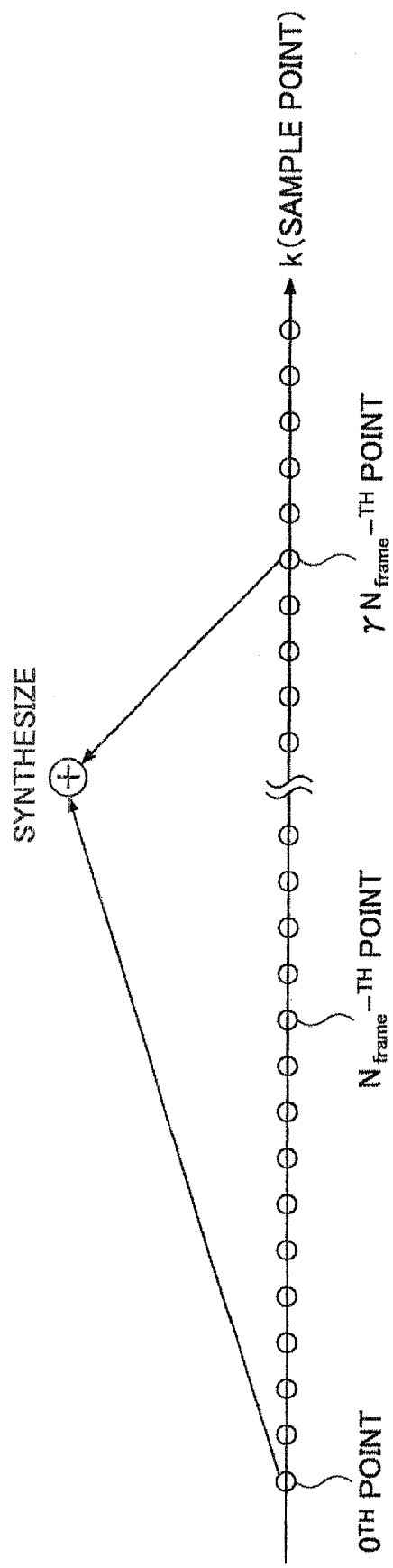
FIG. 11 is an illustrative drawing illustrating an example of the synthesizing of two auto-correlation values with respect to every γ-th frame.

In this expression, correlation synthesis is performed with respect to every γ-th frame. If γ is 2, for example, every second frame (i.e., every other frame) is used in the computation of correlation synthesis. FIG. 11 is an illustrative drawing illustrating an example of the synthesizing of two auto-correlation values with respect to every γ-th frame. The value of γ may be defined as a function of a Doppler frequency fd, and may be increased as the traveling speed of the communication apparatus decreases. The channel response function that represents the characteristics of the transmission path may not vary significantly when the traveling speed of the communication apparatus is slow. Even in such a case, correlation synthesis may be performed by use of temporally-spaced-apart frames that have high independency of each other (i.e., have little correlation with each other). This arrangement can effectively reduce the effect of channel response and the like.

Moreover, the correlation synthesis as represented by expression (12) may be performed by use of a forgetting factor β as represented by expression (16).

$$\varepsilon'''(k \bmod N_{frame}) = (1-\beta)Topx(\varepsilon(k \bmod N_{frame} + N_{frame})) + \beta Topx(\varepsilon(k \bmod N_{frame})) \quad (16)$$

where:

β: Forgetting Factor

Figure 12:
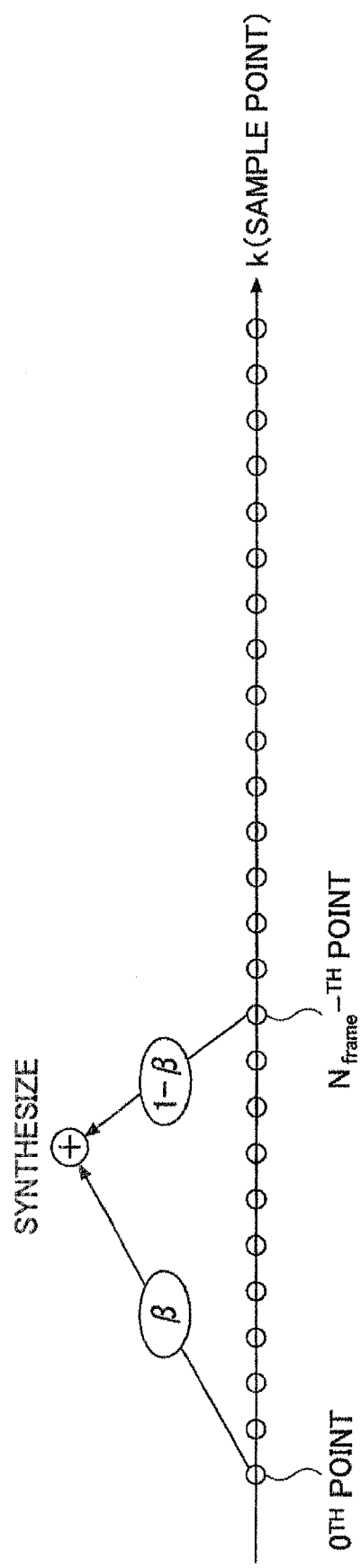
FIG. 12 is an illustrative drawing illustrating an example of the synthesizing of auto-correlation values multiplied by respective weighting factors.

Namely, the synthesizing of auto-correlation values by the correlation value synthesizing unit 25 of FIG. 3 may be performed with respect to auto-correlation values that are multiplied by respective weighting factors (β and 1−β). FIG. 12 is an illustrative drawing illustrating an example of the synthesizing of auto-correlation values multiplied by respective weighting factors (β and 1−β). The distance from an object with which synchronization is established may change due to movement. Such change can be effectively followed by the arrangement described herein.

According to at least one embodiment, the sync detecting unit uses the correlation value synthesizing unit to synthesize plural auto-correlation values, thereby improving the reliability of auto-correlation values. As a result, the synchronization sample points detected by the sync detecting unit accurately match the positions of the synchronizing signal.

Further, the present invention is not limited to these embodiments, but various variations and modifications may be made without departing from the scope of the present invention.

All examples and conditional language recited herein are intended for pedagogical purposes to aid the reader in understanding the invention and the concepts contributed by the inventor to furthering the arts and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A sync detector, comprising:
a correlation computing unit configured to receive signal values corresponding to respective sample points and to compute auto-correlation of the received signal values between sample points of interest and sample points that are situated at a distance equal to a constant number of sample points from the sample points of interest;
a correlation value synthesizing unit configured to receive auto-correlation values corresponding to respective sample points obtained by the correlation computing unit and to synthesize the auto-correlation values with respect to at least two sample points among sample points that are spaced apart by the constant number of sample points thereby to compute a synthesized correlation value; and
a peak-point detecting unit configured to detect a position of a sample point corresponding to a largest synthesized correlation value among synthesized correlation values corresponding to respective sample points obtained by the correlation value synthesizing unit.

2. The sync detector as claimed in claim 1, further comprising a correlation value extracting unit configured to select, from the auto-correlation values corresponding to respective sample points obtained by the correlation computing unit, a predetermined number of auto-correlation values that are larger than the remaining unselected auto-correlation values and to supply the selected auto-correlation values to the correlation value synthesizing unit, wherein the correlation value synthesizing unit computes the synthesized correlation value without using auto-correlation values other than the selected auto-correlation values supplied from the correlation value extracting unit.

3. The sync detector as claimed in claim 1, wherein said at least two sample points are two consecutive ones of the sample points that are spaced apart by the constant number of sample points.

4. The sync detector as claimed in claim 1, wherein said at least two sample points are every n-th one of the sample points that are spaced apart by the constant number of sample points, n being an integer number greater than 1.

5. The sync detector as claimed in claim 1, wherein the correlation value synthesizing unit synthesizes auto-correlation values by adding up auto-correlation values.

6. The sync detector as claimed in claim 1, wherein the correlation value synthesizing unit synthesizes auto-correlation values by adding up auto-correlation values that are multiplied by respective weighting factors.

7. A communication apparatus, comprising:
a correlation computing unit configured to receive signal values corresponding to respective sample points as a received signal and to compute auto-correlation of the received signal values between sample points of interest and sample points that are situated at a distance equal to a constant number of sample points from the sample points of interest;
a correlation value synthesizing unit configured to receive auto-correlation values corresponding to respective sample points obtained by the correlation computing unit and to synthesize the auto-correlation values with respect to at least two sample points among sample points that are spaced apart by the constant number of sample points thereby to compute a synthesized correlation value;
a peak-point detecting unit configured to detect a position of a sample point corresponding to a largest synthesized correlation value among synthesized correlation values corresponding to respective sample points obtained by the correlation value synthesizing unit; and
a signal processing unit configured to process the received signal by using a synchronization point that is the position of the sample point corresponding to the largest synthesized correlation value detected by the peak-point detecting unit.

8. The communication apparatus as claimed in claim 7, wherein the received signal is an OFDM signal, and the signal processing unit is an FFT unit.

9. The communication apparatus as claimed in claim 7, further comprising a correlation value extracting unit configured to select, from the auto-correlation values corresponding to respective sample points obtained by the correlation computing unit, a predetermined number of auto-correlation values that are larger than the remaining unselected auto-correlation values and to supply the selected auto-correlation values to the correlation value synthesizing unit, wherein the correlation value synthesizing unit computes the synthesized correlation value without using auto-correlation values other than the selected auto-correlation values supplied from the correlation value extracting unit.

10. The communication apparatus as claimed in claim 7, wherein said at least two sample points are two consecutive ones of the sample points that are spaced apart by the constant number of sample points.

11. The communication apparatus as claimed in claim 7, wherein said at least two sample points are every n-th one of the sample points that are spaced apart by the constant number of sample points, n being an integer number greater than 1.

12. The communication apparatus as claimed in claim 7, wherein the correlation value synthesizing unit synthesizes auto-correlation values by adding up auto-correlation values.

13. The communication apparatus as claimed in claim 7, wherein the correlation value synthesizing unit synthesizes auto-correlation values by adding up auto-correlation values that are multiplied by respective weighting factors.

\* \* \* \* \*